3,031,457
SALTS OF 4-METHYL-5(β-HALOGENOETHYL)-
THIAZOLE AND CERTAIN SULFONIC ACIDS
Raymond Charonnat, deceased, late of Paris, France, by Solange Costes Charonnat, executrix, 47 Quai de la Tournelle, Paris, France; Paul Lechat, 11 Place Malesherbes, Paris, France; Jean Chareton, 108 Rue Jean Jaures, Noisy-le-Sec, France; and Andre Boime, 70 Ave. Didier, La Varenne-Sthilaire, France
No Drawing. Filed May 3, 1960, Ser. No. 26,445
Claims priority, application France Sept. 28, 1955
6 Claims. (Cl. 260—302)

The present invention relates to new salts of 4-methyl-5 (β-halogenoethyl)-thiazole and certain sulfonic acids. This application is a continuation-in-part of our copending applications Serial Nos. 610,884 filed September 20, 1956 and 717,315 filed February 25, 1958 (and both now abandoned).

More particularly, the invention comprises new sulfonic acid salts of 4-methyl-5-(β-halogenoethyl)-thiazole wherein halogeno stands for chloro or bromo and wherein the salts are formed by combining the thiazole base with certain hereinafter specified alkane sulfonic acids, camphosulfonic acids and isethionic acid. The new salts are useful as moderators or depressants of the activity of the cerebral cortex.

The present invention provides new salts of 4-methyl-5-(β-halogenoethyl)-thiazoles with methane and ethane mono- and poly-sulfonic acids, α- and β-camphosulfonic acids and isethionic acid. Compounds according to the invention are the methane sulfonic, methane disulfonic, methane trisulfonic, ethane sulfonic, ethane disulfonic, ethane tetrasulfonic and isethionic acid salts of 4-methyl-5-(β-halogenoethyl)-thiazole, where halogeno is chloro or bromo.

The procedure for preparing these salts comprises reacting a 4-n ethyl-5-(β-halogenoethyl)-thiazole with one of the above enumerated acids in an organic solvent and recovering the salt thus formed. The method is preferably carried out by dissolving the base and the acids separately in acetone and gradually admixing the same and then isolating and purifying the crystalline salt thus formed.

Therapeutic compositions containing one of the above designated salts or mixtures thereof in combination with a pharmaceutical vehicle or carrier can be made to produce compositions in unit oral or parenteral dosage form. These compositions have a depressant action on the activity of the cerebral cortex and are extremely effective without adverse side effects or toxicity.

The new salts of 4-methyl-5-(β-halogenoethyl)-thiazole with one or more of the above designated acids are characterized by good stability, favorable solubility, ease of handling and good toleration and are especially characterized by the fact that they produce a desirable and controllable moderating or depressant action on the activity of the cerebral cortex when administered either orally or parenterally. By appropriate selection of dosage, frequency of administration and, in the case of injectable solutions, appropriate concentration, it is possible to achieve various favorable conditions ranging from deep sleep for an important surgical operation to progressive re-establishment to normal of a disturbed sleep pattern.

The new salts are also useful in the treatment of various forms of mental derangement and disturbance, such as schizophrenia, acute manic states, various convulsive states (particularly the crises of delirium tremens) and various reactions of hyper-excitability of normal individuals resulting from repetitive movements or the sight of rapid movements. All of the above conditions are favorably influenced and overcome by administration of the new salts.

It has further been observed that the light sleep established for obstetrical operations and the deep sleep established for surgical operations are accompanied by a respiratory euphoria and a euphoria on waking in marked contrast to the use of the usual general anaesthetics.

The invention is further illustrated by the following non-limitative examples:

EXAMPLE I

*The Methane Sulfonate Salt of 4-Methyl-5-(β-Chloroethyl)-Thiazole*

Equimolecular amounts of methane sulfonic acid and 4-methyl-5-(β-chloroethyl)-thiazole are mixed in a crystallizing vessel. An appreciable rise in temperature is observed. On cooling, crystals appear after a few minutes and after crystallization is complete the crystals are dried and washed with acetone. The melting point is 88° C.

The 4-methyl-5-(β-chloroethyl)-thiazole is prepared as follows:

A solution of 166 grams of thionyl chloride in 650 ml. of chloroform is prepared by cooling at $-5°$ C. in a mixture of ice and salt. A solution of 100 grams of 4-methyl-5-(β-hydroxyethyl)-thiazole in 200 ml. of chloroform is added dropwise thereto, while maintaining the cooling and stirring vigorously. The mixture is allowed to stand overnight in the cold. The chloroform and excess thionyl chloride are then distilled off at reduced pressure, the last traces of the solid product being eliminated by adding 50 ml. of absolute alcohol and distilling. In this manner, the hydrochloride of 4-methyl-5-(β-chloroethyl) thiazole is obtained. The hydrochloride is converted to the base by dissolving it in water and neutralizing the solution with sodium bicarbonate. The product is extracted three times with ether, dried on sodium sulfate and rectified at reduced pressure.

EXAMPLE II

*The Methane Disulfonate Salt of 4-Methyl-5 (β-Chloroethyl)-Thiazole*

21.2 grams of methane disulfonic acid dihydrate are dissolved in the minimum amount of acetone. 32.3 grams of 4-methyl-5-(β-chloroethyl)-thiazole are separately dissolved in an equal volume of acetone. The second solution is then added gradually to the first solution, whereupon a white crystalline precipitate rapidly appears which is separated by centrifuging and washed with cold acetone. The 4-methyl-5-(β-chloroethyl)-thiazole methane disulfonate thus obtained is purified by recrystallization from methanol and ether. This is carried out by dissolving the salt in methanol to provide a concentrated solution and adding ether thereto. Should the solution have any objectionable coloration, this is removed by the addition of activated carbon in the usual way. Crystallization spontaneously initiates and is allowed to continue at low temperature and the crystals are then washed with a mixture of equal volumes of methanol and ether and then dried. The final product is white, has the empirical formula $C_{13}H_{20}O_6S_4N_2Cl_2$ and melts at 120° C. (instantaneous melting point). Calculations show that the percentage of the base (64.6%) is in accordance with the value estimated for a salt having two molecules of the base. The product is not hygroscopic under normal conditions.

EXAMPLE III

*The Ethane-1.2-Disulfonate Salt of 4-Methyl-5-(β-Chloroethyl)-Thiazole*

226 grams of ethane disulfonic acid dihydrate are dissolved in the minimum amount of acetone and the solution filtered. Separately 323 grams of 4-methyl-5-(β-chloroethyl)-thiazole are dissolved in their own volume of acetone. The first solution is added gradually to the second solution and the mixture is thoroughly stirred. Crystallization spontaneously initiates and is allowed to continue at low temperature. The precipitate obtained after storage in a refrigerator is separated, washed with cold acetone and dried in air or in an oven at 37° C. The product is purified by dissolving it while hot in methanol and after cooling adding an equal volume of ether and then allowing the resulting mixture to undergo crystallization in a refrigerator. 50 grams of the salt require 100 milliliters of methanol and the same volume of ether. The 4-methyl-5-(β-chloroethyl)-thiazole ethane disulfonate in dry form melts at 124° C. (instantaneous melting point) and has the empirical formula $$C_{14}H_{22}O_6S_4N_2Cl_2$$

The percentage of base (62.9%) is in accordance with calculations for a salt having two molecules of the base. The product is neither volatile nor hygroscopic under normal storage conditions.

The salt has the following structural formula:

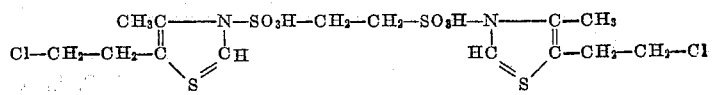

EXAMPLE IV

*The Methane Disulfonate Salt of 4-Methyl-5-(β-Chloroethyl)-Thiazole*

21.2 grams of methane disulfonic acid dihydrate are dissolved in the minimum amount of ethanol. 32.3 grams of 4-methyl-5-(β-chloroethyl)-thiazole are gradually added to the above solution, causing the rapid appearance of a white crystalline precipitate. The precipitate is purified by recrystallization from ethanol and ether. The concentrated solution in ethanol is decolorized by carbon, if necessary, and the ether added thereto. The crystallization thus initiated is allowed to continue at low temperature. The crystals are washed with a mixture of equal volumes of ethanol and ether and are then dried. The final product is white, has the empirical formula $C_{13}H_{20}O_6S_4N_2Cl_2$ and melts at 120° C. (instantaneous melting point).

The percentage of the base (64.6%) is in accordance with the value estimated for a salt having two molecules of the base. The product is not hygroscopic under normal conditions.

EXAMPLE V

*The Ethane-1.2-Disulfonate Salt of 4-Methyl-5-(β-Chloroethyl)-Thiazole*

226 grams of ethane disulfonic acid dihydrate are dissolved in the minimum amount of methanol. 323 grams of 4-methyl-5-(β-chloroethyl)-thiazole are added gradually to the above solution, causing the rapid appearance of a white crystalline precipitate. The product is purified by dissolving it in methanol and, after cooling, adding an equal volume of ether, and then allowing the resulting mixture to crystallize in a refrigerator. 50 grams of the salt require 100 milliliters of methanol and the same volume of ether. The dry salt melts at 124° C. (instantaneous melting point). The empirical formula is $C_{14}H_{22}O_6S_4N_2Cl_2$. The percentage of base found (62.9%) is in accordance with the value estimated for a salt having two molecules of the base. The product is neither volatile nor hygroscopic under normal storage conditions.

EXAMPLE VI

*The Ethane-1.2-Disulfonate Salt of 4-Methyl-5-(β-Chloroethyl)-Thiazole*

226 grams of ethane disulfonic acid dihydrate are dissolved in the minimum amount of butanol. 323 grams of 4-methyl-5-(β-chloroethyl)-thiazole are added gradually to the above solution, causing the rapid appearance of a white crystalline precipitate. The precipitate is purified by dissolving it in butanol and, after cooling, adding an equal volume of ether, and then allowing the resulting mixture to crystallize in a refrigerator. 50 grams of the salt require 100 milliliters of butanol and the same volume of ether. The dry salt melts at 124° C. (instantaneous melting point). The empirical formula is $C_{14}H_{22}O_6S_4N_2Cl_2$. The percentage of base found (62.9%) is in accordance with the value estimated for a salt having two molecules of the base. The product is neither volatile nor hygroscopic under normal storage conditions.

EXAMPLE VII

*The β-Camphosulfonate Salt of 4-Methyl-5-(β-Chloroethyl)-Thiazole*

23 grams of Reychler's camphosulfonic acid are dissolved under heating in sufficient acetone to form a solution. 16.1 grams of 4-methyl-5-(β-chloroethyl)-thiazole are separately dissolved in acetone. After cooling, the acid solution is added gradually to the thiazole solution while stirring. A precipitate forms immediately which is separated, dried, washed in acetone and recrystallized from alcohol at 96° C. as white crystals having a melting point of 176° C.

The α-camphosulfonate (melting point 173° C.) and the various optically active and racemic camphosulfonic acid salts are prepared in similar manner.

In the foregoing examples, acetone, methanol, ethanol and butanol have been set forth as species of organic solvents utilizable in the preparation of the new salts. We have further found that any low molecular weight aliphatic alcohol or cyclohexanol can be satisfactorily used and that the organic solvent is thus not limited to the use of acetone, methanol, ethanol or butanol.

The new salts are prepared in dosage form with any suitable carrier or vehicle and are administered to human patients as cachets, coated or uncoated tablets, capsules and injectable solutions. The particular amount administered depends on the severity of the condition being treated and the very low toxicity of the salts enables the necessary dosage to be used without adverse side effects. For example, a 2% solution of the ethane disulfonate salt can be injected intravenously in a dosage of 1.20 gr. (3 vials of 20 ml.) in 2–3 minutes to produce immediate sleep remarkable for its rapidity of onset and in a period of 1 to 4 hours up to 4.80 gr. (12 vials) can be injected without difficulty.

The invention is characterized by unusual versatility of the salts and compositions for a variety of conditions, giving selective action on the higher levels and a moderating action on the activity of the cerebral cortex. The compositions can be administered by any desired oral or parenteral route and in an amount sufficient to obtain the desired results, as the toxicity is very low. The duration of the action can be either short or prolonged by repeated administrations or continuous perfusions, depending on circumstances and the judgment of the physician or technician. Pharmacological tests show that the lethal dosage ($LD_{100}$) is very many times that of pentobarbital sodium and hence there is a large safety factor. The compositions are essentially composed of one of the above new salts or a mixture of such salts combined with a pharmaceutical vehicle or carrier in which the salt is dissolved or suspended or with which it is combined or physically associated.

The invention is defined by the appended claims.

What is claimed is:

1. A compound selected from the group consisting of the methane sulfonic, methane disulfonic, methane trisulfonic, ethane sulfonic, ethane disulfonic, ethane tetrasulfonic, isethionic, α-camphosulfonic and β-camphosulfonic acid salts of 4-methyl-5-(β-chloroethyl)-thiazole and 4-methyl-5-(β-bromoethyl)-thiazole.

2. 4-methyl-5-(β-chloroethyl)-thiazole methane sulfonate.

3. Methyl-4-β-chloroethyl-5-thiazole methane disulfonate.

4. Methyl-4-β-chloroethyl-5-thiazole ethane disulfonate.

5. 4-methyl-5-(β-chloroethyl)-thiazole α-camphosulfonate.

6. 4-methyl-5-(β-chloroethyl)-thiazole β-camphosulfonate.

References Cited in the file of this patent

FOREIGN PATENTS 792,158   Great Britain _____ Mar. 19, 1958